(12) United States Patent
Turmel et al.

(10) Patent No.: US 12,067,135 B2
(45) Date of Patent: Aug. 20, 2024

(54) SECURE VIDEO CAPTURE PLATFORM

(71) Applicant: NETFLIX, INC., Los Gatos, CA (US)

(72) Inventors: Frederic Turmel, Sunnyvale, CA (US); Alexander David Wolfe, San Jose, CA (US); Matthew Michael Lehman, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 176 days.

(21) Appl. No.: 17/121,351

(22) Filed: Dec. 14, 2020

(65) Prior Publication Data

US 2022/0188432 A1 Jun. 16, 2022

(51) Int. Cl.
| | |
|---|---|
| G06F 21/62 | (2013.01) |
| G06F 21/16 | (2013.01) |
| G06F 21/74 | (2013.01) |
| G06F 21/76 | (2013.01) |
| H04N 1/32 | (2006.01) |

(52) U.S. Cl.
CPC .......... G06F 21/6209 (2013.01); G06F 21/16 (2013.01); G06F 21/74 (2013.01); G06F 21/76 (2013.01); H04N 1/32149 (2013.01)

(58) Field of Classification Search
CPC ...... G06F 21/6209; G06F 21/16; G06F 21/76; G06F 21/74
See application file for complete search history.

(56) References Cited

U.S. PATENT DOCUMENTS

| | | | |
|---|---|---|---|
| 8,009,673 B2* | 8/2011 | Gandal | H04L 45/742 370/392 |
| 8,397,069 B2* | 3/2013 | Alkove | H04N 21/4405 713/168 |
| 8,406,462 B2* | 3/2013 | Radhakrishnan | G06V 20/46 382/100 |
| 9,558,159 B1* | 1/2017 | Thirupparangiri | G06F 40/242 |
| 10,095,953 B2* | 10/2018 | Smolic | H04N 13/111 |
| 10,671,854 B1* | 6/2020 | Mahyar | G06N 20/00 |
| 10,674,075 B2* | 6/2020 | Kimura | H04N 23/633 |
| 10,887,560 B2* | 1/2021 | Leow | G06F 21/32 |
| 10,917,704 B1* | 2/2021 | Hamid | H04N 21/4725 |
| 11,126,650 B2* | 9/2021 | Stojancic | G06F 16/9014 |
| 11,363,070 B2* | 6/2022 | Okunlola | H04L 63/102 |
| 11,461,393 B1* | 10/2022 | Jain | H04N 21/858 |
| 2002/0061122 A1 | 5/2002 | Fujihara et al. | |
| 2004/0008865 A1 | 1/2004 | Anzai et al. | |
| 2011/0145935 A1 | 6/2011 | Adams et al. | |

(Continued)

OTHER PUBLICATIONS

International Search Report for Application No. PCT/US2021/062262 dated Mar. 29, 2022.

*Primary Examiner* — Viral S Lakhia
(74) *Attorney, Agent, or Firm* — Artegis Law Group, LLP

(57) ABSTRACT

Various embodiments set forth systems and techniques for securing media content capture capabilities on a device. The techniques include receiving a frame of a media content item; determining whether the frame of the media content item is signed based on an analysis of one or more pixels of the frame; and when the media content is signed, removing one or more restrictions on one or more functions on the device based on whether the one or more pixels on the frame meet one or more conditions, wherein the one or more functions enable the device to perform one or more operations on the frame of the media content item.

18 Claims, 8 Drawing Sheets

(56) References Cited

U.S. PATENT DOCUMENTS

| | | | |
|---|---|---|---|
| 2014/0237628 A1* | 8/2014 | Petrovic | G06F 21/10 |
| | | | 726/30 |
| 2018/0240024 A1* | 8/2018 | Huang | G06F 16/2462 |
| 2018/0270516 A1* | 9/2018 | Dalbec | H04N 21/4622 |
| 2018/0288060 A1* | 10/2018 | Jackson | H04L 63/107 |
| 2019/0138778 A1* | 5/2019 | Lohar | G07D 7/0047 |
| 2019/0347666 A1* | 11/2019 | Bermudez-Cisneros | G06N 20/00 |
| 2019/0348050 A1* | 11/2019 | Kim | G10L 17/14 |
| 2020/0065526 A1* | 2/2020 | Berman | G06T 1/0028 |
| 2020/0210552 A1* | 7/2020 | McSchooler | H04N 21/23418 |
| 2020/0267404 A1* | 8/2020 | Levy | G06T 1/0028 |
| 2020/0342100 A1* | 10/2020 | Goldstein | G06F 21/52 |
| 2021/0176289 A1* | 6/2021 | Franklin | H04N 21/26258 |
| 2021/0297629 A1* | 9/2021 | Lemes da Silva | G06F 18/214 |
| 2021/0382932 A1* | 12/2021 | Stojancic | G06F 16/783 |
| 2022/0101814 A1* | 3/2022 | Patel | G06F 3/0482 |
| 2022/0114241 A1* | 4/2022 | Van Foreest | H04N 21/44008 |
| 2022/0148009 A1* | 5/2022 | Vyas | G06Q 30/0185 |

\* cited by examiner

SECURE VIDEO CAPTURE PLATFORM

BACKGROUND

Field of the Various Embodiments

Embodiments of the present disclosure relate generally to media content platforms, and, more specifically, to secure video capture platform.

Description of the Related Art

Media content (e.g., audio or video content) is increasingly distributed over the internet, allowing users to easily access such content using a broad range of internet-connected electronic devices (e.g., smart TVs, smart devices). Many content providers allow users to access media content through a broad range of digital platforms and content streaming applications (e.g., internet television). In addition, media content is increasingly being delivered in real time, for instance, by live streaming of media content (e.g., simultaneously recording and broadcasting the media content).

The rollout of 5G mobile networks has further allowed many content providers to expand streaming services, relying more on live video encoding and streaming equipment. For instance, many content providers rely on equipment that allows for capturing and adapting high resolution (e.g., Ultra High Definition/UHD) video feeds and encoding such video feeds for streaming to a wide variety of media content servers for delivery and distribution to internet-connected electronic devices.

Media content is susceptible to unauthorized copying during transmission over the wide variety of connections (e.g., high-definition multimedia interface (HDMI), high-definition serial digital interface (HD-SDI), gigabit video interface (GVIF), serial digital interface (SDI), digital visual interface (DVI), unified display interface (UDI), Display-Port (DP) interface, or the like). Content providers typically rely on existing digital output protection technologies (e.g., High-bandwidth Digital Content Protection (HDCP)) to prevent media content from being played on unauthorized devices. Such technologies rely on a mix of features, such as authentication to prevent unlicensed devices from receiving media content (e.g., through a master key used to generate device keys), encryption of the media content during transmission to prevent interception or eavesdropping (e.g., through stream cipher), key revocation to prevent compromised or cloned devices from receiving media content (e.g., through adding revoked devices to blacklists).

However, existing digital output protection technologies are flawed and can be circumvented. For instance, master keys can either be leaked or reverse engineered, allowing hackers to generate device keys that circumvent existing restrictions. In other instances, hackers can clone licensed devices using public keys, circumvent revocation lists, or remove content protection using devices such as HDCP rippers/splitters, thereby allowing for unauthorized capture of media content. In addition, existing techniques do not provide content providers with a way to control security within a media content item (e.g., each frame), or to vary conditions under which permissions to capture capabilities on a device should be granted.

Accordingly, there is a need for improved techniques for preventing unauthorized capture of media content.

SUMMARY

One embodiment of the present invention sets forth a computer-implemented method for securing media content capture capabilities on a device, the method comprising receiving a frame of a media content item; determining whether the frame of the media content item is signed based on an analysis of one or more pixels of the frame; and when the media content is signed, removing one or more restrictions on one or more functions on the device based on whether the one or more pixels on the frame meet one or more conditions, wherein the one or more functions enable the device to perform one or more operations on the frame of the media content item.

Other embodiments include, without limitation, a computer system that performs one or more aspects of the disclosed techniques, as well as one or more non-transitory computer-readable storage media including instructions for performing one or more aspects of the disclosed techniques.

Disclosed techniques allow for media content capture and streaming capabilities to be restricted at the hardware level, thereby making such copy restrictions difficult to circumvent unless permission is explicitly encoded within the media content item. The disclosed techniques allow content providers to incorporate the security features within each frame of the media content item, thereby providing more granular control over restrictions on media content. Further, content providers can dynamically vary the predetermined conditions under which restrictions on each frame of the media content item can be removed, thereby allowing more control over the security of the content. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
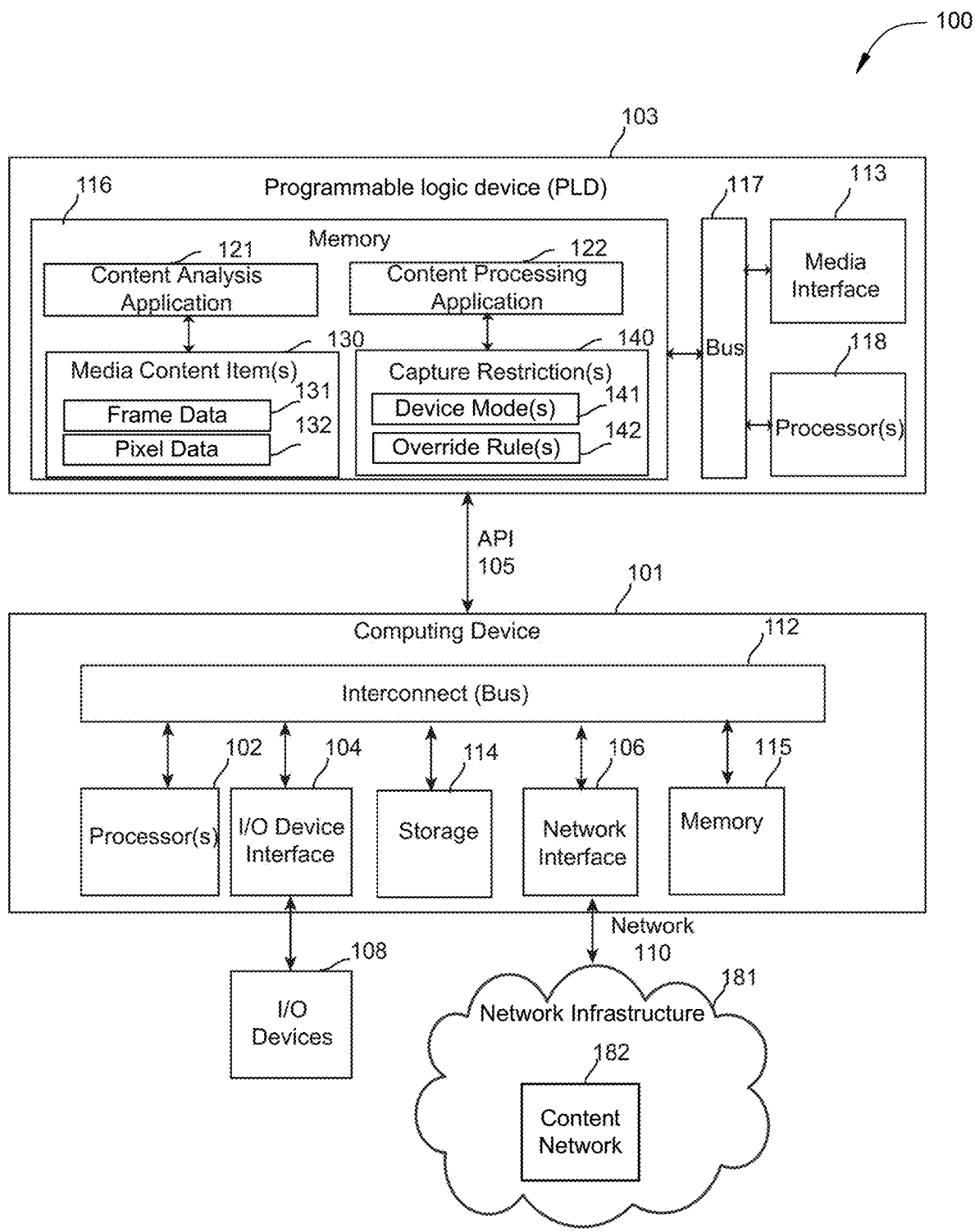
FIG. 1 is a schematic diagram illustrating a computing system 100 configured to implement one or more aspects of the present disclosure.

In the following description, numerous specific details are set forth to provide a more thorough understanding of the various embodiments. However, it will be apparent to one skilled in the art that the inventive concepts may be practiced without one or more of these specific details.

Many content providers provide media content through a broad range of digital platforms and content streaming applications (e.g., internet television) accessible via internet-connected electronic devices (e.g., smart TVs, smart devices). In order to protect the media content from unauthorized copying during transmission, content providers typically rely on conventional digital output protection techniques to prevent media content from being played on unauthorized devices. Such conventional digital output protection technologies rely on a mix of features, such as authentication to prevent unlicensed devices from receiving media content, encryption of the media content during transmission to prevent interception or eavesdropping, key revocation to prevent compromised or cloned devices from receiving media content, or the like.

However, these conventional technologies are flawed and can be circumvented, such as by reverse engineering master keys, by cloning licensed devices using public keys, by circumventing revocation lists, by removing content protection using devices such as HDCP rippers/splitters, or the like. Further, these conventional technologies do not provide content providers with a way to control security on a granular level within a media content item (e.g., at each frame), or to vary conditions under which permissions to capture capabilities on a device should be granted.

In contrast, in disclosed techniques, media content capture and streaming capabilities are restricted at the hardware level, and are therefore difficult to circumvent unless permission is explicitly encoded within the media content item. In disclosed embodiments, a content processing application determines a device mode associated with a computing system based on configuration data associated with a programmable logic device, such as a field programmable gate array (FPGA) or the like. The content processing application then determines whether one or more capture restrictions are associated with the device mode. When the content processing application determines that one or more capture restrictions are associated with the device mode, a content analysis application analyzes pixel data, frame data, or the like associated with the one or more frames to determine whether the one or more frames are signed. When the content analysis application determines that the one or more frames are signed, the content analysis application compares the one or more frames to one or more conditions defined in one or more override rules.

When the content analysis application determines that the one or more frames meet one or more conditions defined in one or more override rules, the content processing application removes one or more capture restrictions associated with device mode. The content processing application then performs one or more operations on the one or more frames such as receiving, transmitting, reproducing, copying, processing, or the like. When the content analysis application determines that the one or more frames are not signed or that the one or more frames do not meet one or more conditions defined in one or more override rules, the content processing application restricts one or more functions based on one or more capture restrictions associated with the device mode. For instance, the content processing application restricts the number of valid frames received by the computing system (e.g., reducing the frame rate from 60 fps to 1 fps), reduces the resolution of the frame (e.g., from 4k to HD, 8k to SD, or the like), replaces of one or more frames with another frame (e.g., a black frame, a duplicate frame, a predefined subset of frames, or the like).

Advantageously, disclosed techniques allow for media content capture and streaming capabilities to be restricted at the hardware level, thereby making such copy restrictions difficult to circumvent unless permission is explicitly encoded within the media content item. The disclosed techniques allow content providers to incorporate the security features within each frame of the media content item, thereby providing more granular control over restrictions on media content. Further, content providers can dynamically vary the predetermined conditions under which restrictions on each frame of the media content item can be removed, thereby allowing more control over the security of the content. These technical advantages provide one or more technological advancements over prior art approaches.

FIG. 1 illustrates a computing system 100 configured to implement one or more aspects of the present disclosure. As shown, computing system 100 includes, without limitation, programmable logic device (PLD) 103 and computing device 101 coupled via application programming interface (API) 105.

Computing device 101 includes an interconnect (bus) 112 that connects one or more processor(s) 102, an input/output (I/O) device interface 104 coupled to one or more input/output (I/O) devices 108, memory 115, a storage 114, and a network interface 106 coupled to network 110 and connected to network infrastructure 181.

Computing device 101 includes a desktop computer, a laptop computer, a smart phone, a personal digital assistant (PDA), tablet computer, or any other type of computing device configured to receive input, process data, and optionally display images, and is suitable for practicing one or more embodiments. Computing device 101 described herein is illustrative and that any other technically feasible configurations fall within the scope of the present disclosure.

Interconnect (bus) 112 includes one or more reconfigurable interconnects that links one or more components of computing device 101 such as one or more processors, one or more input/output ports, storage, memory, or the like. In some embodiments, interconnect (bus) 112 combines the functions of a data bus, an address bus, a control bus, or the like. In some embodiments, interconnect (bus) 112 includes an I/O bus, a single system bus, a shared system bus, a local bus, a peripheral bus, an external bus, a dual independent bus, or the like.

Processor(s) 102 includes any suitable processor implemented as a central processing unit (CPU), a graphics processing unit (GPU), an application-specific integrated circuit (ASIC), a field programmable gate array (FPGA), an artificial intelligence (AI) accelerator, any other type of processor, or a combination of different processors, such as a CPU configured to operate in conjunction with a GPU. In general, processor(s) 102 may be any technically feasible hardware unit capable of processing data and/or executing software applications. Further, in the context of this disclosure, the computing elements shown in computing device 101 may correspond to a physical computing system (e.g., a system in a data center) or may be a virtual computing instance executing within a computing cloud.

I/O device interface 104 enables communication of I/O devices 108 with processor(s) 102. I/O device interface 104 generally includes the requisite logic for interpreting addresses corresponding to I/O devices 108 that are generated by processor(s) 102. I/O device interface 104 may also be configured to implement handshaking between processor(s) 102 and I/O devices 108, and/or generate interrupts associated with I/O devices 108. I/O device interface 104 may be implemented as any technically feasible CPU, ASIC, FPGA, any other type of processing unit or device.

I/O devices 108 include devices capable of providing input, such as a keyboard, a mouse, a touch-sensitive screen, a microphone, a remote control, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user of computing system 100, and to also provide various types of output to the end-user of computing system 100, such as displayed digital images or digital videos or text. In some embodiments, one or more of I/O devices 108 are configured to couple computing system 100 to a network 110.

In some embodiments, I/O devices 108 can include, without limitation, a smart device such a personal computer, personal digital assistant, tablet computer, mobile phone, smart phone, media player, mobile device, or any other device suitable for implementing one or more aspects of the present invention. I/O devices 108 can augment the functionality of computing system 100 by providing various services, including, without limitation, telephone services, navigation services, infotainment services, or the like. Further, I/O devices 108 can acquire data from sensors and transmit the data to computing system 100. I/O devices 108 can acquire sound data via an audio input device and transmits the sound data to computing system 100 for processing. Likewise, I/O devices 108 can receive sound data from computing system 100 and transmit the sound data to an audio output device so that the user can hear audio originating from computing system 100. In some embodiments, I/O devices 108 include sensors configured to acquire biometric data from the user (e.g., heartrate, skin conductance, or the like) and transmit signals associated with the biometric data to computing system 100. The biometric data acquired by the sensors can then be processed by a software application running on computing system 100. In various embodiments, I/O devices 108 include any type of image sensor, electrical sensor, biometric sensor, or the like, that is capable of acquiring biometric data including, for example and without limitation, a camera, an electrode, a microphone, or the like.

In some embodiments, I/O devices 108 include, without limitation, input devices, output devices, and devices capable of both receiving input data and generating output data. I/O devices 108 can include, without limitation, wired or wireless communication devices that send data to or receive data from smart devices, headphones, smart speakers, sensors, remote databases, other computing devices, or the like. Additionally, in some embodiments, I/O devices 108 may include a push-to-talk (PTT) button, such as a PTT button included in a vehicle, on a mobile device, on a smart speaker, or the like.

Storage 114 includes non-volatile storage for applications and data, and may include fixed or removable disk drives, flash memory devices, and CD-ROM, DVD-ROM, Blu-Ray, HD-DVD, or other magnetic, optical, solid state storage devices, or the like. In some embodiments, any of the software programs on PLD 103 such as content analysis application 121, content processing application 122, media content item(s) 130, or capture restriction(s) 140 may be stored in storage 114 on computing device 101 and loaded into either memory 115 on computing device 101 or memory 116 on PLO 103 when executed.

Memory 115 includes a random access memory (RAM) module, a flash memory unit, or any other type of technically feasible memory unit or combination thereof on computing device 101. Processor(s) 102, I/O device interface 104, and network interface 106 are configured to read data from and write data to memory 115. In some embodiments, any of the software programs on PLD 103 such as content analysis application 121, content processing application 122, media content item(s) 130, or capture restriction(s) 140 are stored in memory 115 on computing device 101.

Network 110 includes any technically feasible type of communications network that allows data to be exchanged between computing system 100 and external entities or devices, such as a web server or another networked computing device. For example, network 110 may include a wide area network (WAN), a local area network (LAN), a wireless (WiFi) network, and/or the Internet, among others.

Network interface 106 is a computer hardware component that connects processor 102 to a communication network. Network interface 106 may be implemented in computing system 100 as a stand-alone card, processor, or other hardware device. In some embodiments, network interface 106 may be configured with cellular communication capability, satellite telephone communication capability, a wireless WAN communication capability, or other types of communication capabilities that allow for communication with a communication network and other computing devices external to computing system 100.

Network infrastructure 181 can be any technically feasible Internet-based computing system, such as a distributed computing system or a cloud-based storage system. In some embodiments, network infrastructure 181 includes, without limitation, a plurality of networks, a plurality of servers, a plurality of operating systems, a plurality of storage devices, or the like. The server may be a standalone server, a cluster or "farm" of servers, one or more network appliances, or any other device suitable for implementing one or more aspects of the present disclosure.

Content Network 182 provides media content available in a network infrastructure 181. Content network 182 provides a variety of media content (e.g., movies, video games, music, podcasts, news, sports, ringtones, advertisements, broadcasts, audiobooks, or the like). In some embodiments, content network 182 provides access to media content stored in a media content repository. In some embodiments, the media content is also stored locally on computing system 100. In some embodiments, content network 182 includes a web-based program for selecting media content. In some embodiments, a media content item 130 available via content network 182 can be selected automatically based on data acquired from one or more sensors located on one or more I/O devices 108. For instance, media content on content network 182 can be selected based on a sensor on I/O devices 108 capturing the user voice selection, motion, gesture, or the like associated with the selection of a media content item 130, or the like.

Application programming interface (API) 105 includes any technically feasible programming interface that enables communication between computing device 101 and PLD 103. In some embodiments, API 105 includes functionality to enable programming of PLD 103. In some embodiments, API 105 includes functionality to read configuration data stored in PLD 103.

Programmable logic device (PLD) 103 includes a bus 117 that connects one or more processor(s) 118, memory 116, and a media interface 113. Programmable logic device (PLD) 103 includes any technically feasible reconfigurable or programmable digital circuit with one or more programmable elements, such as a programmable logic array device (PLA), programmable array logic device (PAL), generic array logic device (GAL), complex programmable logic device (CPLD), field programmable gate array (FPGA) or the like. In some embodiments, PLD 103 includes a microprocessor system on a programmable chip or the like.

In some embodiments, PLD 103 includes one or more field programmable gate arrays (FPGAs) with programmable logic blocks that implement one or more logic functions associated with a specific application design. In some embodiments, PLD 103 includes any combination of volatile storage (e.g., static random-access memory (SRAM) or the like), nonvolatile storage (e.g., one-time programmable eFuses, one-time programmable anti-fuses, non-volatile flash memory), or the like. In some embodiments, PLD 103 includes memory cells storing configuration data such as one or more keys, state of one or more programmable elements, or the like. In some embodiments, PLD 103 may be configured to implement one or more encryption algorithms or the like. In some embodiments, the one or more programmable elements of PLD 103 cannot be reprogrammed after configuration (e.g., an FPGA's eFuse control bit permanently set during manufacture or the like). In some embodiments, PLD 103 is configured to avoid reliance on an external bitstream, to require an encrypted bitstream, or the like. In some embodiments, PLD 103 is configured to disable electronic readback capabilities after configuration.

Bus 117 includes one or more reconfigurable interconnects that links one or more components of PLD 103 such as one or more logic blocks, one or more memory elements, one or more processors, one or more input/output ports, storage, or the like. In some embodiments, bus 117 combines the functions of a data bus, an address bus, a control bus, or the like. In some embodiments, bus 117 includes an I/O bus, a single system bus, a shared system bus, a local bus, a peripheral bus, an external bus, a dual independent bus, or the like.

Processor(s) 118 includes any technically feasible processor on PLD 103 such as a microprocessor, a central processing unit (CPU), any other type of processor, a combination of different processors, or the like. In some embodiments, processor(s) 118 include any suitable processor that incorporates the functions of a central processing unit on one or more digital integrated circuits on PLD 103.

Media Interface 113 includes any technically feasible display interface connection that allows for the transmission of media content for display. Media interface 113 includes high-definition multimedia interface (HDMI), high-definition serial digital interface (HD-SDI), gigabit video interface (GVIF), serial digital interface (SDI), digital visual interface (DVI), unified display interface (UDI), DisplayPort (DP) interface, or the like.

Memory 116 includes a random access memory (RAM) module, a flash memory unit, or any other type of technically feasible memory unit or combination thereof on PLD 103. Processor(s) 118 and media interface 113 are configured to read data from and write data to memory 116. Memory 116 includes various software programs that can be executed by processor(s) 118, including content analysis application 121 and content processing application 122, and application data associated with said software programs, including media content item(s) 130 and capture restriction(s) 140.

Media content item(s) 130 includes any media content (e.g., movies, video games, music, podcasts, news, sports, ringtones, advertisements, broadcasts, audiobooks, or the like) that can be transmitted over any technically feasible network. Media content item 130 includes one or more frames of content in any combination of resolutions such as 4k (e.g., 4096×2160 pixels), 8k (e.g., 7680×4320 pixels), quad HD (e.g., 3840×2160 pixels), full HD (e.g., 1920×1080 pixels), HD (e.g., 1280×720 pixels), SD (e.g., 720×480 pixels), 2k (e.g., 2048×1080 pixels), or the like. In some embodiments, media content item 130 includes one or more frames of compressed or encoded content encoded in any combination of multimedia compression formats (e.g., Motion Pictures Expert Group (MPEG)-5, Versatile Video Coding (VVC), MPEG-H, H.265, Advanced Video Coding (AVC), MJPEG, or the like). In some embodiments, media content item 130 includes one or more frames of compressed content, where the data is compressed using any combination of intra-frame compression, interframe compression, or the like. In some embodiments, media content item 130 includes one or more frames of content compressed using any technically feasible compression technique such as discrete cosine transform (DCT), motion compensation (MC), or the like, A given media content item 130 includes, without limitation, frame data 131 and pixel data 132.

Frame data 131 includes any data associated with one or more frames of media content item 130. In some embodiments, frame data 131 includes frame resolution (e.g., 4k, 8k, quad HD, full HD, HD, SD), frame positioning in a frame sequence, frame rate (e.g., 30 frames per second (fps), 24 fps, 101 fps), aspect ratio, tint, brightness, contrast, zoom in/out, video effects, zoom rate, pan rate, scan mode (e.g., interlaced scan, progressive scan), color space (e.g., RGB (based on three color components: Red, Green, and Blue), Y'CbCr (color information encoded in a luminance value Y and two chrominance components: Cb, Cr)), or the like.

Pixel data 132 includes any data associated with one or more pixels of a frame of media content item 130. In some embodiments, pixel data 132 includes luminance value, pixel aspect ratio (e.g., 1:1; 4:3, 10:11), bits per pixel (bpp), color-difference signal, color space (e.g., RGB, Y'CbCr), color bit-depth (total bits used for each color component of a pixel e.g., 8-bits for red, 5-bits for green, 2-bits for blue, 1-bit for transparency), subpixel information (e.g., 3 subpixels based on three color regions), or the like.

Capture restriction(s) 140 include restrictions on the use or function of computing system 100. In some embodiments, capture restriction(s) 140 include restrictions on one or more functions associated with performing one or more operations on media content item 130 (e.g., receiving, transmitting, reproducing, copying, processing, or the like). In some embodiments, capture restriction(s) 140 include restrictions on one or more functions available on computing system 100, including restrictions on content acquisition, content capture, content encoding control, content encoding manipulation, content streaming, content editing, content adaptation, content distribution, or the like. In some embodiments, capture restriction(s) 140 include restrictions on one or more functions associated with one or more components of computing system 100 such as interconnect (bus) 112, processor(s) 102, PLD 103, API 105, I/O device interface 104, I/O devices 108, memory 116, storage 114, media interface 113, network interface 106, network 110, network infrastructure 181 or the like. In some embodiments, capture restriction(s) 140 are determined based configuration data associated with PLD 103.

In some embodiments, capture restriction(s) 140 are tiered to allow different levels of access to different functions on computing system 100, different levels of access to different operations on media content item 130, different levels of access to different functions associated with one or more components of computing system 100, or the like. For instance, one level of access may allow content acquisition or capture of a single frame, but not full video capture. In some embodiments, capture restriction(s) 140 include restrictions on the number of valid frames received by the computing system 100 (e.g., reducing the frame rate from 60 fps to 1 fps), reduction in the resolution of the frame (e.g., from 4k to HD, 8k to SD, or the like), replacement of one or more frames with another frame (e.g., a black frame, a duplicate frame, a predefined subset of frames, or the like).

Device mode(s) 141 include any technically feasible mode of operation of computing system 100. In some embodiments, device mode(s) 141 include one or more user environments associated with one or more configurations that affect one or more functions available on computing system 100 (e.g., functions related to content acquisition, content capture, content encoding control, content encoding manipulation, content streaming, content editing, content adaptation, content distribution, or the like). In some embodiments, device mode(s) 141 include one or more user environments with one or more configurations that affect one or more functions associated with one or more components of computing system 100.

In some embodiments, device mode(s) 141 include a privileged mode of operation that allows operation of computing system 100 without any restrictions on any functions (e.g., no capture restriction(s) 140). In some embodiments, device mode(s) 141 include a restricted mode of operation that restricts one or more functions on computing system 100 based on one or more capture restriction(s) 140 associated with the mode of operation (e.g., restrictions on functions related to content acquisition, content capture, content encoding control, content encoding manipulation, content streaming, content editing, content adaptation, content distribution, or the like).

In some embodiments, device mode(s) 141 are determined based configuration data associated with PLD 103 (e.g., the state of an FPGA's eFuse control bit). In some embodiments, device mode(s) 141 are permanently set during configuration of PLD 103 (e.g., by setting an FPGA's eFuse to enable a restrictive mode of operation, a privileged mode of operation, or the like).

Override rule(s) 142 include one or more rules describing one or more conditions for the override or removal of one or more capture restriction(s) 140 on computing system 100. For example, override rule(s) 142 may include rules describing one or more conditions for override or removal of restrictions on content acquisition, content capture, content encoding control, content encoding manipulation, content streaming, content editing, content adaptation, content distribution, or the like. In some embodiments, override rule(s) 142 include one or more rules describing one or more conditions for the override or removal of restrictions on one or more functions associated with one or more components of computing system 100. In some embodiments, override rule(s) 142 include one or more rules describing one or more conditions for the override or removal of restrictions on the use or function of computing system 100. In some embodiments, override rule(s) 142 include one or more rules describing one or more conditions for the override or removal of restrictions on one or more functions associated with performing one or more operations on media content item 130 (e.g., receiving, transmitting, reproducing, copying, processing, or the like). In some embodiments, override rule(s) 142 include one or more rules describing one or more conditions associated with configuration data stored on PLD 103.

In some embodiments, override rule(s) 142 include one or more rules describing one or more conditions for tiered override or removal of restrictions, with each tiered override or removal resulting in different levels of access to different functionalities on computing system 100, different levels of access to different operations on media content item 130, different levels of access to different functions associated with one or more components of computing system 100, or the like. For instance, override rule(s) 142 may include one or more rules describing one or more conditions for override or removal of one or more restrictions on the number of valid frames received by the computing system 100 (e.g., removing restrictions on the frame rate, removing restrictions on the resolution of the frame, or the like). In some embodiments, the one or more conditions for tiered override or removal of restrictions is associated with variations in the pattern of pixels, digital watermark, or the like included in one or more frames of media content item 130.

In some embodiments, override rule(s) 142 include one or more rules describing one or more conditions for the override or removal of restrictions based on one or more specific patterns of pixels in a frame of media content item 130, In some embodiments, the pattern of pixels includes one or more blocks of pixels dispersed across one or more regions of a frame. In some embodiments, the pattern of pixels includes one or more statistical properties (e.g., mean values, minimum or maximum values, standard deviation, range of values, median values, and/or the like) associated with pixel data 132 (e.g., luminance value(s), pixel aspect ratio, bits per pixel, color difference signal, color space, color bit-depth, subpixel information) corresponding to one or more pixels included in the pattern of pixels. For instance, the pattern of pixels can include mean number of bits per pixel, minimum luminance values per pixel, range of luminance values, maximum number of bits for each color component of a pixel, maximum number of subpixels, or the like.

In some embodiments, the pattern of pixels includes one or more statistical properties (e.g., mean values, minimum or maximum values, standard deviation, range of values, median values, and/or the like) associated with the number of pixels in one or more blocks of pixels included in the pattern of pixels, distances between one or more blocks of pixels included in the pattern of pixels, or the like. In some embodiments, the pattern of pixels defines predefined or dynamic variations in pixel data 132 across one or more pixels included in the pattern (e.g., fixed luminance values for one or more pixels in one region, variable luminance values for one or more pixels in a second region, or the like).

In some embodiments, the predefined or dynamic variations in pixel data 132 is determined based on a tolerance value associated with noise in the signal transmitting the frame of media content item 130.

In some embodiments, override rule(s) 142 include one or more rules describing one or more conditions for the override or removal of restrictions based on a digital watermark associated with one or more block of pixels with a predefined structure. In some embodiments, the digital watermark includes one or more bar codes, symbols, or the like embedded in one or more blocks of pixels in one or more portions of the structure associated with the digital watermark. In some embodiments, the digital watermark includes a predefined structure formed by one or more blocks of pixels dispersed across one or more regions of a frame. In some embodiments, several different watermarks are included in a given frame of media content item 130. In some embodiments, the digital watermark includes one or more statistical properties of pixel data 132 (e.g., luminance value(s), pixel aspect ratio, bits per pixel, color difference signal, color space, color bit-depth, subpixel information) corresponding to one or more pixels included in a block of pixels in one or more portions of the structure associated with the digital watermark (e.g., mean values, minimum or maximum values, standard deviation, range of values, median values, and/or the like). For instance, the digital watermark can include a mean number of bits per pixel in one or more portions of the structure associated with the digital watermark, minimum luminance values per pixel in one or more blocks of pixels in one or more portions of the structure associated with the digital watermark, range of luminance values in one or more blocks of pixels in one or more portions of the structure associated with the digital watermark, maximum number of bits for each color component of per pixel in one or more portions of the structure associated with the digital watermark, maximum number of subpixels in one or more portions of the structure associated with the digital watermark, or the like.

In some embodiments, the digital watermark specifies predefined or dynamic variations in pixel data 132 across one or more blocks of pixels (e.g., fixed luminance values for one or more blocks of pixels in one region, variable luminance values for one or more blocks of pixels in a second region, or the like). In some embodiments, the predefined or dynamic variations in pixel data 132 are determined based on a tolerance value associated with noise in the signal transmitting the frame of media content item 130.

In some embodiments, override rule(s) 142 include one or more rules describing one or more conditions for the override or removal of restrictions based on one or more properties of frame data 131 associated with a frame of media content item 130 (e.g., frame resolution, frame positioning in a frame sequence, frame rate, aspect ratio, tint, brightness, contrast, zoom in/out, video effects, zoom rate, pan rate, scan mode, color space, or the like). In some embodiments, the one or more rules describe one or more conditions for the override or removal of restrictions based on one or more statistical properties of frame data 131 (e.g., mean values, minimum or maximum values, standard deviation, range of values, median values, and/or the like) for a given frame. In some embodiments, the one or more rules describe one or more conditions for the override or removal of restrictions based on predefined or dynamic variations in frame data 131 (e.g., fixed brightness or contrast, variable zoom rate, or the like). In some embodiments, the predefined or dynamic variations in frame data 131 are determined based on a tolerance value associated with noise in the signal transmitting the frame of media content item 130.

In operation, content processing application 122 receives one or more frames of media content item 130. Content processing application 122 determines whether one or more capture restriction(s) 140 are associated with device mode(s) 141. In some embodiments, content processing application 122 determines device mode(s) 141 and the associated capture restriction(s) 140 based configuration data associated with PLD 103.

Content processing application 122 processes the one or more frames of media content item 130 based on whether one or more capture restriction(s) 140 are associated with device mode(s) 141. When device mode(s) 141 is associated with no capture restriction(s) 140 (e.g., when content processing application 122 determines that the device mode 141 is a privileged mode of operation), content processing application 122 enables one or more functions associated with performing one or more operations on media content item 130 (e.g., receiving, transmitting, reproducing, copying, processing, or the like). When device mode(s) 141 is associated with one or more capture restriction(s) 140 (e.g., when content processing application 122 determines that the device mode 141 is a restricted mode of operation), content processing application 122 determines how to process the one or more frames of media content item 130 based on the result of the analysis performed by content analysis application 121.

As a part of the analysis, content analysis application 121 determines whether a given frame of media content item 130 is signed by analyzing one or more statistical properties of pixel data 132 (e.g., luminance value(s), pixel aspect ratio, bits per pixel, color difference signal, color space, color bit-depth, subpixel information) corresponding to one or more pixels in the frame. In some embodiments, content analysis application 121 determines whether the given frame is signed by analyzing one or more statistical properties of frame data 131 (e.g., frame resolution, frame positioning in a frame sequence, frame rate, aspect ratio, tint, brightness, contrast, zoom in/out, video effects, zoom rate, pan rate, scan mode, color space, or the like). In some embodiments, content analysis application 121 analyzes each pixel, a subset of pixels, one or more regions of each frame, a predefined subset of frames, or the like in real time. In some embodiments, content analysis application 121 uses one or more pattern recognition algorithms, watermark detection algorithms, or the like to determine whether a given frame of media content item 130 is signed. For instance, content analysis application 121 can determine existence of patterns of pixels, digital watermarks, or the like by scanning one or more pixels in a given frame to detect one or more transitions or changes in pixel values associated with pixel data 132 (e.g., luminance value(s), pixel aspect ratio, bits per pixel, color difference signal, color space, color bit-depth, subpixel information).

When content analysis application 121 determines that a given frame is signed, content analysis optionally determines whether the frame meets one or more conditions defined in one or more override rule(s) 142. In some embodiments, content analysis application 121 compares the one or more detected transitions or changes in pixel values, frame data 131, pixel data 132, or the like against the one or more conditions defined in one or more override rule(s) 142 (e.g., one or more patterns of pixels, digital watermarks, or the like) to determine whether the one or more conditions are met. For instance, content analysis application 121 can compare the one or more detected transitions or changes in pixel values against one or more predefined or dynamic variations in pixel data 132 associated with a digital watermark or a specific pattern of pixels associated with one or more conditions in one or more override rule(s) 142.

When content analysis application 121 determines that a given frame of media content item 130 meets one or more conditions defined in one or more override rule(s) 142, content processing application 122 removes or overrides one or more capture restriction(s) 140 associated with device mode 141 (e.g., restrictions on content acquisition, content capture, content encoding control, content encoding manipulation, content streaming, content editing, content adaptation, content distribution, or the like). In some embodiments, when content analysis application 121 determines that a given frame of media content item 130 is signed, content processing application 122 removes or overrides one or more capture restriction(s) 140 associated with device mode 141. In some embodiments, content processing application 122 removes or overrides one or more capture restriction(s) 140 associated with one or more components of computing system 100. In some embodiments, when content analysis application 121 determines that a given frame meets one or more conditions associated with one or more rules for tiered override or removal of restrictions, content processing application 122 performs a tiered override or removal of one or more restrictions associated with device mode 141 (e.g., removing restrictions on the frame rate, removing restrictions on the resolution of the frame, or the like).

When content analysis application 121 determines that a given frame of media content item 130 is not signed or that the frame does not meet one or more conditions defined in one or more override rule(s) 142, content processing application 122 restricts one or more functions on computing system 100 based on one or more capture restriction(s) 140 associated with the device mode 141 (e.g., by applying restrictions on functions related to content acquisition, content capture, content encoding control, content encoding manipulation, content streaming, content editing, content adaptation, content distribution, or the like). In some embodiments, content processing application 122 restricts the number of valid frames received by the computing system 100 (e.g., reducing the frame rate from 60 fps to 1 fps), reduces the resolution of the frame (e.g., from 4k to HD, 8k to SD, or the like). In other embodiments, content processing application 122 replaces one or more frames with another frame (e.g., a black frame, a duplicate frame, a predefined subset of frames, or the like).

Figure 2:
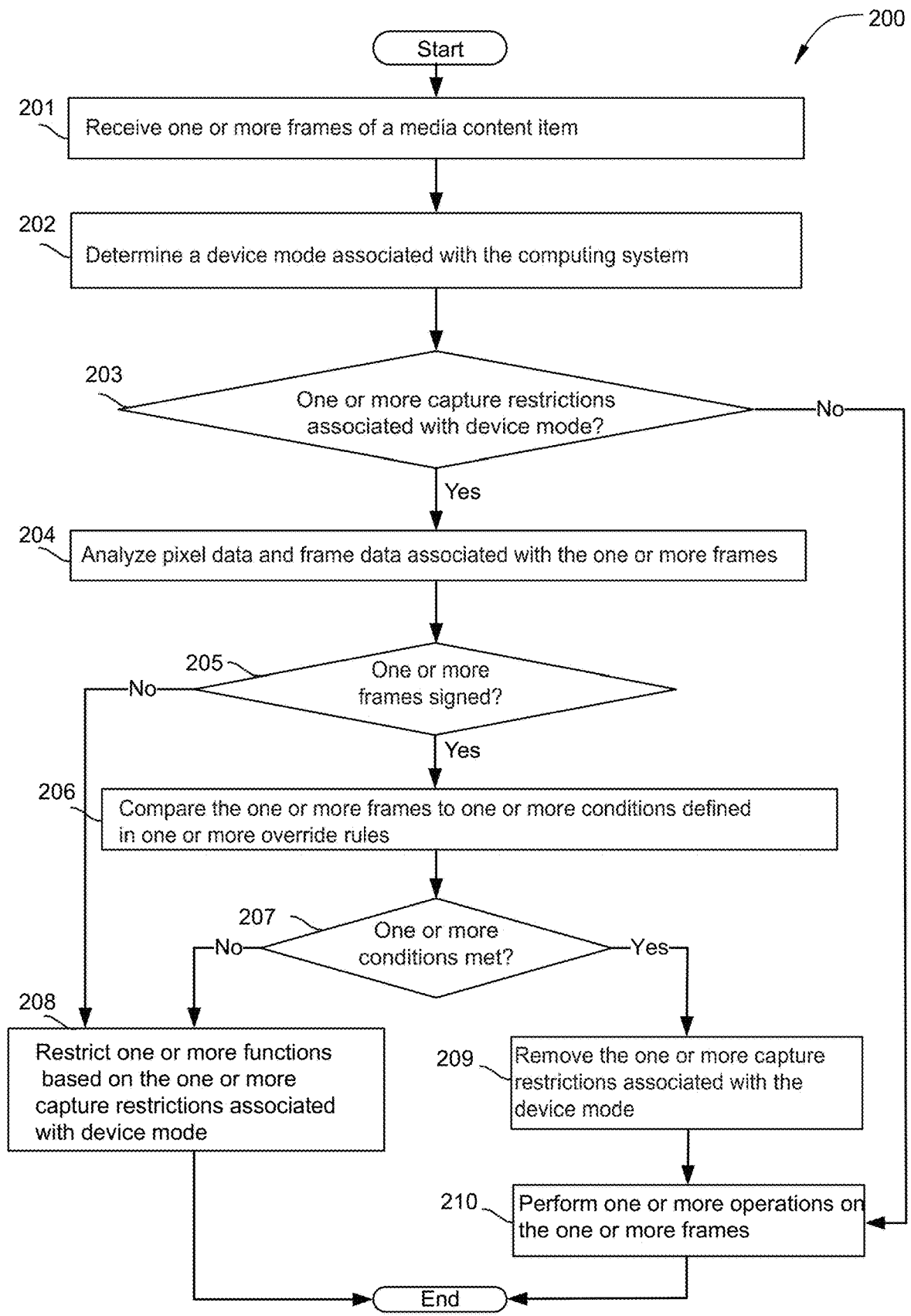
FIG. 2 is a flowchart of method steps for securing media content capture capabilities on computing system 100, according to various embodiments of the present disclosure.

FIG. 2 is a flowchart of method steps 200 for securing media content capture capabilities on computing system 100 performed by computing system of FIG. 1, according to various embodiments of the present disclosure. Although the method steps are described in conjunction with the system of FIG. 1, persons skilled in the art will understand that any system configured to perform the method steps in any order falls within the scope of the present disclosure.

In step 201, content processing application 122 receives one or more frames of media content item 130. In some embodiments, content processing application 122 receives the one or more frames of media content items from a web-based program, a program stored locally on computing system 100, content network 182, or the like. In some embodiments, content processing application 122 receives one or more frames associated with one or more portions of media content item 130 based on user input, user selection determined based on one or more sensors associated with I/O devices 108, or the like.

In step 202, content processing application 122 determines a device mode(s) 141 associated with the computing system 100. In some embodiments, content processing application 122 determines device mode 141 based on configuration data associated with PLD 103. In some embodiments, content processing application 122 determines device mode 141 by querying a networked storage device, such as a device connected to network infrastructure 181, or the like. In some embodiments, content processing application 122 determines device mode 141 by querying a local storage on computing system 100, such as storage 114 or the like.

In some embodiments, device mode 141 is associated with one or more configurations that affect the use or function of computing system 100. In some embodiments, device mode 141 is associated with one or more configurations associated with performing one or more operations on media content item 130. In some embodiments, device mode 141 is associated with one or more configurations that affect one or more functions associated with one or more components of computing system 100.

In step 203, content processing application 122 determines whether one or more capture restriction(s) 140 are associated with device mode(s) 141. In some embodiments, content processing application 122 determines the one or more capture restriction(s) 140 associated with device mode 141 based on configuration data associated with PLD 103. In some embodiments, content processing application 122 determines the one or more capture restriction(s) 140 by querying a networked storage device, such as a device connected to network infrastructure 181, or the like. In some embodiments, content processing application 122 determines the one or more capture restriction(s) 140 by querying a local storage on computing system 100, such as storage 114 or the like.

In some embodiments, capture restriction(s) 140 include restrictions on the use or function of computing system 100. In some embodiments, capture restriction(s) 140 include restrictions on one or more functions associated with performing one or more operations on media content item 130, restrictions on one or more functions available on computing system 100, restrictions on one or more functions associated with one or more components of computing system 100, or the like. In some embodiments, capture restriction(s) 140 are tiered to allow different levels of access to different functions on computing system 100, different levels of access to different operations on media content item 130, different levels of access to different functions associated with one or more components of computing system 100, or the like.

When content processing application 122 determines that no capture restriction(s) 140 are associated with device mode(s) 141, the procedure advances to step 210. When content processing application 122 determines that one or more capture restriction(s) 140 are associated with device mode(s) 141, the procedure advances to step 204.

In step 204, content analysis application 121 analyzes pixel data 132 and frame data 131 associated with the one or more frames. In some embodiments, content analysis application 121 analyzes one or more statistical properties (e.g., mean values, minimum or maximum values, standard deviation, range of values, median values, and/or the like) of pixel data 132 (e.g., luminance value(s), pixel aspect ratio, bits per pixel, color difference signal, color space, color bit-depth, subpixel information) corresponding to one or more pixels in the frame. In some embodiments, content analysis application 121 analyzes one or more statistical properties of frame data 131 (e.g., frame resolution, frame positioning in a frame sequence, frame rate, aspect ratio, tint, brightness, contrast, zoom in/out, video effects, zoom rate, pan rate, scan mode, color space, or the like). In some embodiments, content analysis application 121 analyzes each pixel, a subset of pixels, one or more regions of each frame, a predefined subset of frames, or the like in real time.

In step 205, content analysis application 121 determines whether the one or more frames are signed. In some embodiments, content analysis application 121 determines whether the one or more frames are signed based on the one or more statistical properties of the pixel data 132, the one or more statistical properties of the frame data 131, or the like. In some embodiments, content analysis application 121 uses one or more pattern recognition algorithms, watermark detection algorithms, or the like to determine whether a given frame of media content item 130 is signed. For instance, content analysis application 121 can determine existence of patterns of pixels, digital watermarks, or the like by scanning one or more pixels in a given frame to detect one or more transitions or changes in pixel values associated with pixel data 132 (e.g., luminance value(s), pixel aspect ratio, bits per pixel, color difference signal, color space, color bit-depth, subpixel information).

When content analysis application 121 determines that the one or more frames are signed, the procedure advances to step 206. When content analysis application 121 determines that the one or more frames are not signed, the procedure advances to step 208.

In step 206, content analysis application 121 compares the one or more frames to one or more conditions defined in one or more override rule(s) 142. In some embodiments, content analysis application 121 compares the one or more detected transitions or changes in pixel values, frame data 131, pixel data 132, or the like against the one or more conditions defined in one or more override rule(s) 142 (e.g., one or more patterns of pixels, digital watermarks, or the like) to determine whether the one or more conditions are met. For instance, content analysis application 121 can compare the one or more detected transitions or changes in pixel values against one or more predefined or dynamic variations in pixel data 132 associated with a digital watermark or a specific pattern of pixels associated with one or more conditions in one or ore override rule(s) 142.

In step 207, content analysis application 121 determines whether the one or more frames meet one or more conditions defined in one or more override rule(s) 142. In some embodiments, content analysis application 121 whether the one or more frames meet one or more conditions defined in one or more override rule(s) 142 based on the one or more statistical properties of the pixel data 132, the one or more statistical properties of the frame data 131, the one or more detected transitions or changes in pixel values, or the like. In some embodiments, content analysis application 121 uses one or more pattern recognition algorithms, watermark detection algorithms, or the like to determine whether the one or more frames meet one or more conditions defined in one or more override rule(s) 142.

When content analysis application 121 determines that the one or more frames meet one or more conditions defined in one or more override rule(s) 142, the procedure advances to step 209. When content analysis application 121 determines that the one or more frames do not meet one or more conditions defined in one or more override rule(s) 142, the procedure advances to step 208.

In step 208, content processing application 122 restricts one or more functions based on one or more capture restriction(s) 140 associated with the device mode 141. In some embodiments, content processing application 122 restricts one or more functions associated with performing one or more operations on media content item 130, restricts one or more functions available on computing system 100, restricts one or more functions associated with one or more components of computing system 100, or the like. In some embodiments, content processing application 122 performs a tiered restriction to allow different levels of access to different functions on computing system 100, different levels of access to different operations on media content item 130, different levels of access to different functions associated with one or more components of computing system 100, or the like.

In some embodiments, content processing application 122 restricts the number of valid frames received by the computing system 100 (e.g., reducing the frame rate from 60 fps to 1 fps), reduces the resolution of the frame (e.g., from 4k to HD, 8k to SD, or the like), replaces of one or more frames with another frame (e.g., a black frame, a duplicate frame, a predefined subset of frames, or the like).

In step 209, content processing application 122 removes one or more capture restriction(s) 140 associated with device mode 141. In some embodiments, content processing application 122 removes one or more restrictions on one or more functions associated with performing one or more operations on media content item 130, removes one or more restrictions on one or more functions available on computing system 100, removes one or more restrictions on one or more functions associated with one or more components of computing system 100, or the like. In some embodiments, content processing application 122 performs a tiered removal of one or more restrictions to allow different levels of access to different functions on computing system 100, different levels of access to different operations on media content item 130, different levels of access to different functions associated with one or more components of computing system 100, or the like.

In step 210, content processing application 122 performs one or more operations on the one or more frames. In some embodiments, the operations include receiving, transmitting, reproducing, copying, processing, or the like of the one or more frames. In some embodiments, content processing application 122 performs one or more operations associated with content acquisition, content capture, content encoding control, content encoding manipulation, content streaming, content editing, content adaptation, content distribution, or the like. In some embodiments, content processing application 122 performs one or more operations associated with one or more functions provided by one or more components of computing system 100.

Figure 3A:
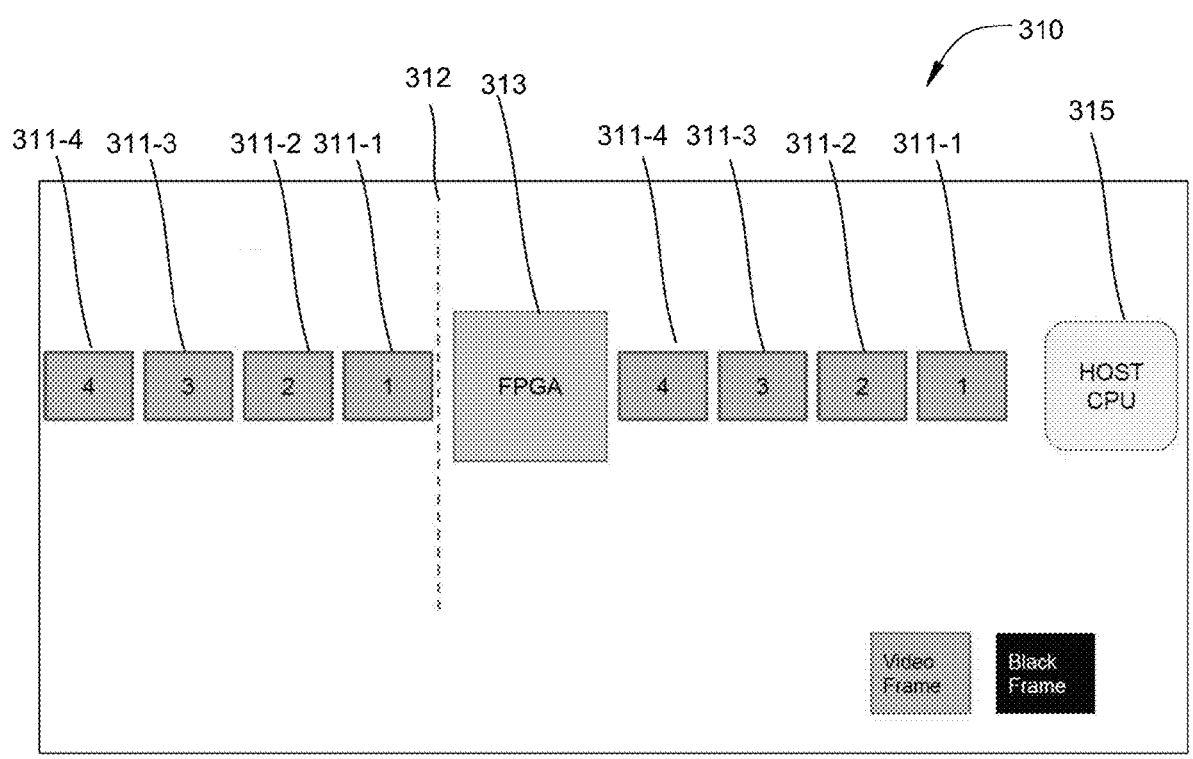
FIG. 3A is an example implementation of the techniques for securing media content capture capabilities on computing system 100, according to various embodiments of the present disclosure.

FIG. 3A is an example implementation 310 of the techniques for securing media content capture capabilities on computing system 100 performed by computing system of FIG. 1, according to various embodiments of the present disclosure. Although the techniques are described in conjunction with the system of FIG. 1, persons skilled in the art will understand that any system configured to perform the method steps in any order falls within the scope of the present disclosure.

As illustrated in FIG. 3A, content processing application 122 receives one or more frames 311-1, 311-2, 311-3, 311-4 of media content item 130. The one or more frames 311-1, 311-2, 311-3, 311-4 are received via a media interface 312 (e.g., HDMI). Content processing application 122 determines a device mode 141 associated with the computing system 100 based on configuration data associated with PLD 313 (e.g., FPGA). Content processing application 122 determines whether one or more capture restriction(s) 140 are associated with device mode 141.

When content processing application 122 determines that no capture restriction(s) 140 are associated with device mode 141, content processing application 122 performs, via processor 315 (e.g., host CPU), one or more operations on the one or more frames 311-1, 311-2, 311-3, 311-4. In some embodiments, content processing application 122 performs operations including receiving one or more frames 311-1, 311-2, 311-3, 311-4; transmitting one or more frames 311-1, 311-2, 311-3, 311-4; reproducing one or more frames 311-1, 311-2, 311-3, 311-4; copying one or more frames 311-1, 311-2, 311-3, 311-4; processing one or more frames 311-1, 311-2, 311-3, 311-4; or the like.

Figure 3B:
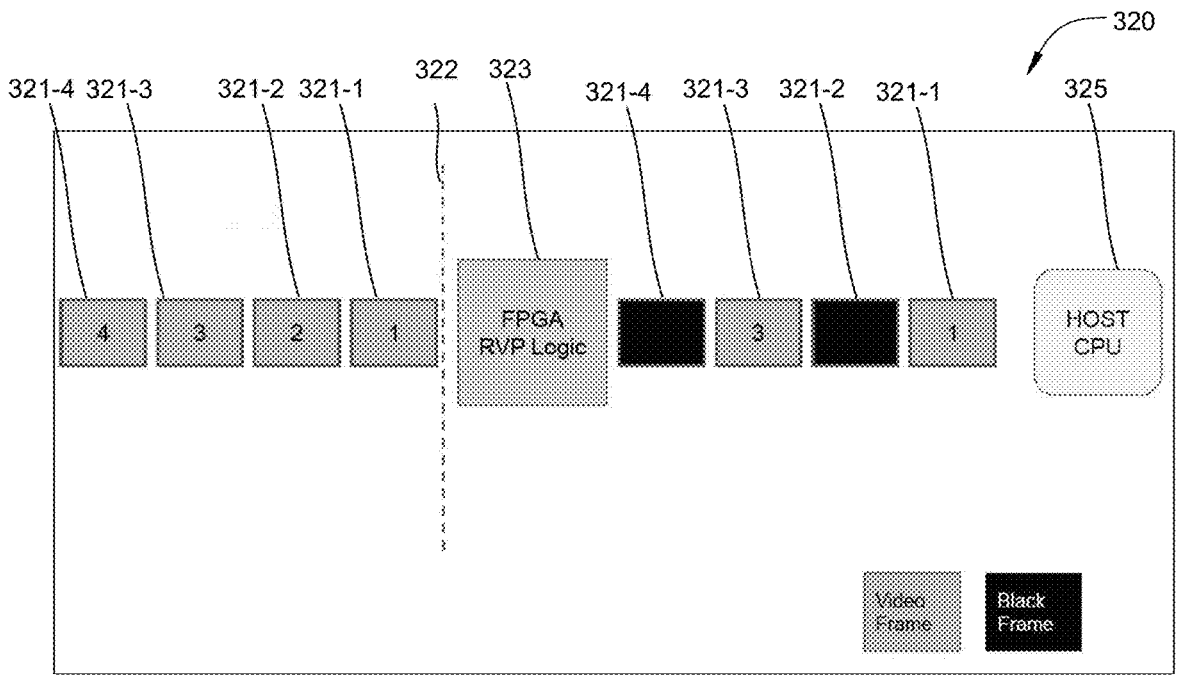
FIG. 3B is an example implementation of the techniques for securing media content capture capabilities on computing system 100, according to various embodiments of the present disclosure.

FIG. 3B is an example implementation 320 of the techniques for securing media content capture capabilities on computing system 100 performed by computing system of FIG. 1, according to various embodiments of the present disclosure. Although the techniques are described in conjunction with the system of FIG. 1, persons skilled in the art will understand that any system configured to perform the method steps in any order falls within the scope of the present disclosure.

As illustrated in FIG. 3B, content processing application 122 receives one or more frames 321-1, 321-2, 321-3, 321-4 of media content item 130. The one or more frames 321-1, 321-2, 321-3, 321-4 are received via a media interface 322 (e.g., HDMI). Content processing application 122 determines a device mode 141 associated with the computing system 100 based on configuration data associated with PLD 323 (e.g., restricted video path (RVP) logic stored on FPGA). Content processing application 122 determines whether one or more capture restriction(s) 140 are associated with device mode 141.

When content processing application 122 determines that one or more capture restriction(s) 140 are associated with device mode 141, content analysis application 121 analyzes, via processor 325 (e.g., host CPU), pixel data 132 and frame data 131 associated with the one or more frames 321-1, 321-2, 321-3, 321-4 to determine whether the one or more frames 321-1, 321-2, 321-3, 321-4 are signed. When content analysis application 121 determines that the one or more frames 321-1, 321-2, 321-3, 321-4 are not signed, content processing application 122 restricts one or more functions based on one or more capture restriction(s) 140 associated with the device mode 141. For instance, content processing application 122 restricts the number of valid frames received by the computing system 100 (e.g., reducing the frame rate from 60 fps to 1 fps), reduces the resolution of the one or more frames (e.g., from 4k to HD, 8k to SD, or the like), replaces of one or more frames (e.g., 321-4, 321-2) with another frame (e.g., a black frame or the like).

Figure 3C:
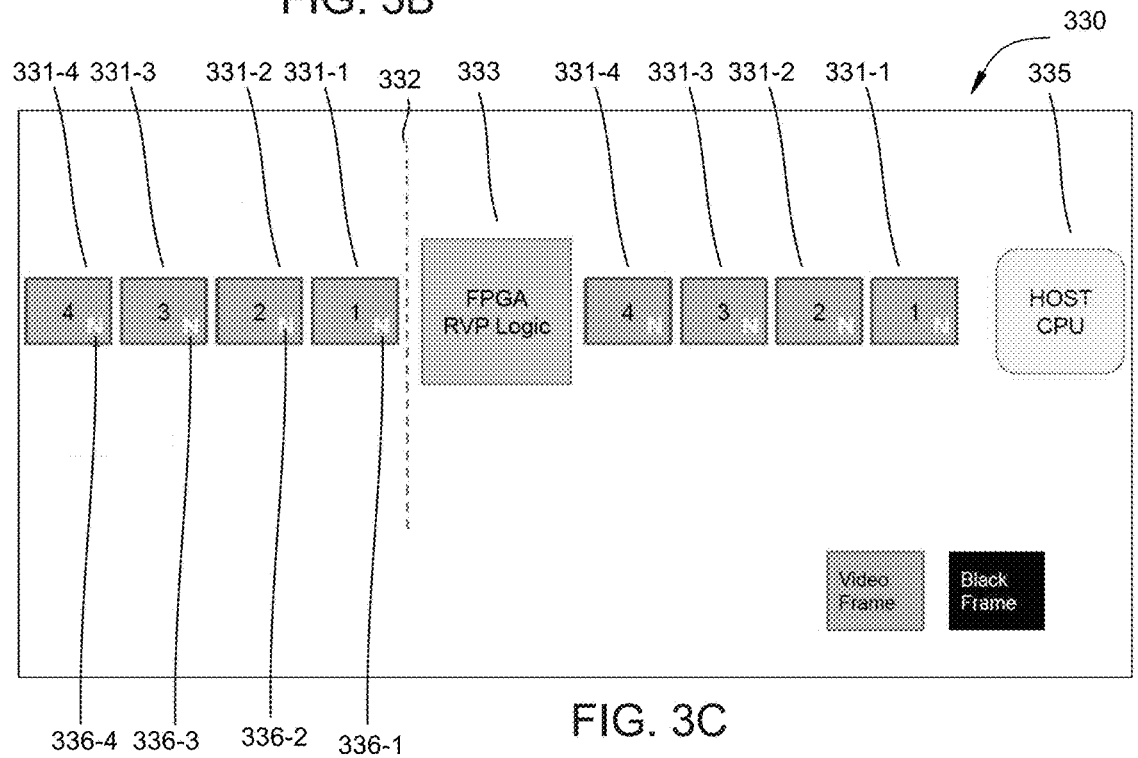
FIG. 3C is an example implementation of the techniques for securing media content capture capabilities on computing system 100, according to various embodiments of the present disclosure.

FIG. 3C is an example implementation 330 of the techniques for securing media content capture capabilities on computing system 100 performed by computing system of FIG. 1, according to various embodiments of the present disclosure. Although the techniques are described in conjunction with the system of FIG. 1, persons skilled in the art will understand that any system configured to perform the method steps in any order falls within the scope of the present disclosure.

As illustrated in FIG. 3C, content processing application 122 receives one or more frames 331-1, 331-2, 331-3, 331-4 of media content item 130. The one or more frames are received via a media interface 332 (e.g., HDMI). Content processing application 122 determines, via processor 335 (e.g., host CPU), a device mode 141 associated with the computing system 100 based on configuration data associated with PLD 333 (e.g., restricted video path (RVP) logic stored on FPGA). Content processing application 122 determines whether one or more capture restriction(s) 140 are associated with device mode 141.

When content processing application 122 determines that one or more capture restriction(s) 140 are associated with device mode 141, content analysis application 121 analyzes, via processor 335 (e.g., host CPU), pixel data 132 and frame data 131 associated with the one or more frames 331-1, 331-2, 331-3, 331-4 to determine whether the one or more frames 331 are signed. When content analysis application 121 determines that the one or more frames 331-1, 331-2, 331-3, 331-4 are signed (e.g., via a pattern or pixels 336), content analysis application 121 optionally compares the one or more frames 331-1, 331-2, 331-3, 331-4 to one or more conditions defined in one or more override rule(s) 142. In some embodiments, content analysis application 121 compares the one or more detected transitions or changes in pixel values, frame data 131, pixel data 132, or the like against the one or more conditions defined in one or more override rule(s) 142 (e.g., one or more patterns of pixels, digital watermarks, or the like) to determine whether the one or more conditions are met.

When content analysis application 121 determines that the one or more frames 331-1, 331-2, 331-3, 331-4 meet one or more conditions defined in one or more override rule(s) 142, content processing application 122 removes one or more capture restriction(s) 140 associated with device mode 141. Content processing application 122 then performs one or more operations including receiving one or more frames 331-1, 331-2, 331-3, 331-4; transmitting one or more frames 331-1, 331-2, 331-3, 331-4; reproducing one or more frames 331-1, 331-2, 331-3, 331-4; copying one or more frames 331-1, 331-2, 331-3, 331-4; processing one or more frames 331-1, 331-2, 331-3, 331-4; or the like.

Figure 4:
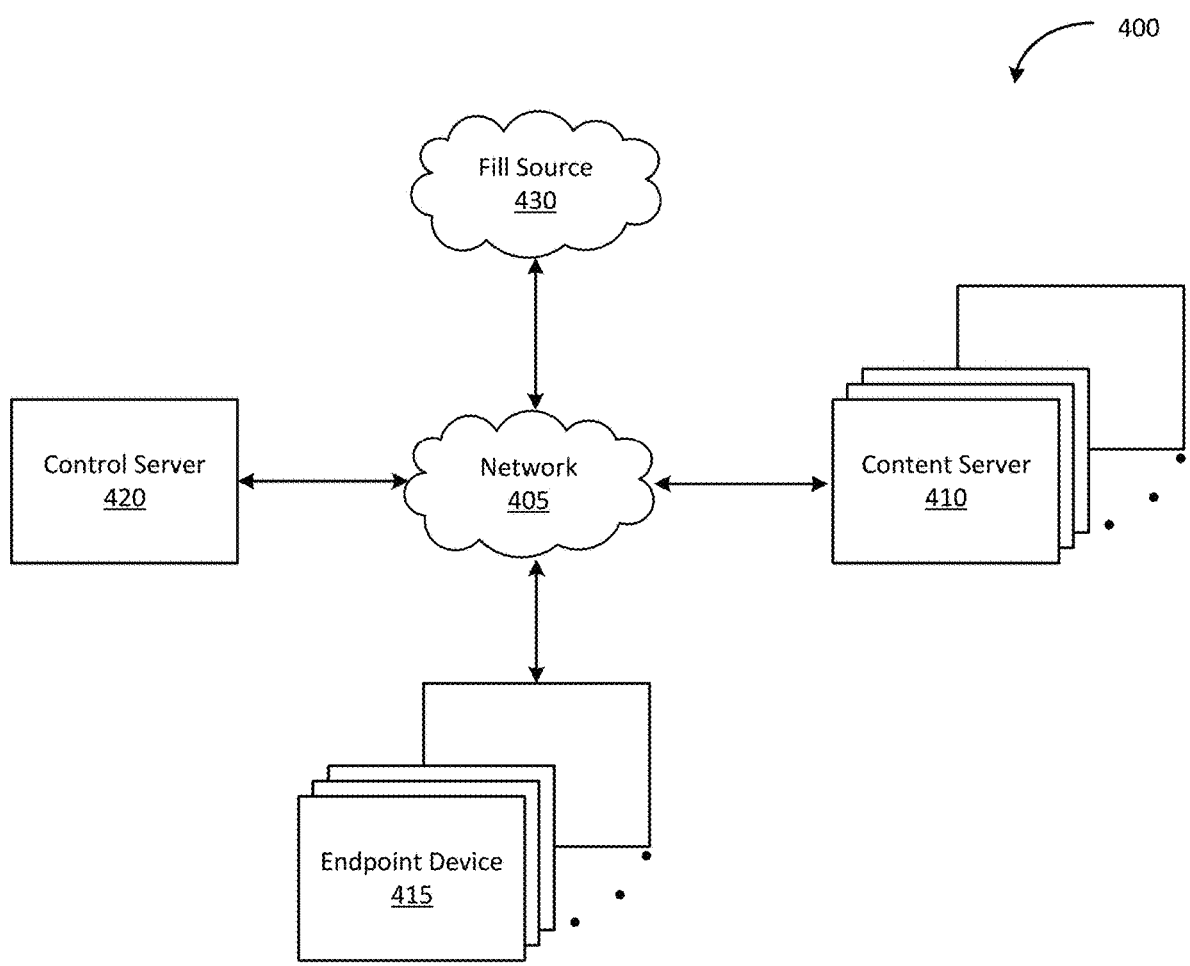
FIG. 4 illustrates a network infrastructure used to distribute content to content servers and endpoint devices, according to various embodiments of the present disclosure.

FIG. 4 illustrates a network infrastructure 400 used to distribute content to content servers 410 and endpoint devices 415, according to various embodiments of the invention. As shown, the network infrastructure 400 includes content servers 410, control server 420, and endpoint devices 415, each of which are connected via a network 405.

Each endpoint device 415 communicates with one or more content servers 410 (also referred to as "caches" or "nodes") via the network 405 to download content, such as textual data, graphical data, audio data, video data, and other types of data. The downloadable content, also referred to herein as a "file," is then presented to a user of one or more endpoint devices 415. In various embodiments, the endpoint devices 415 may include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Each content server 410 may include a web-server, database, and server application 517 configured to communicate with the control server 420 to determine the location and availability of various files that are tracked and managed by the control server 420. Each content server 410 may further communicate with a fill source 430 and one or more content servers 410 in order "fill" each content server 410 with copies of various files. In addition, content servers 410 may respond to requests for files received from endpoint devices 415. The files may then be distributed from the content server 410 or via a broader content distribution network. In some embodiments, the content servers 410 enable users to authenticate (e.g., using a username and password) in order to access files stored on the content servers 410. Although only a single control server 420 is shown in FIG. 4, in various embodiments multiple control servers 420 may be implemented to track and manage files.

In various embodiments, the fill source 430 may include an online storage service (e.g., Amazon® Simple Storage Service, Google® Cloud Storage, etc.) in which a catalog of files, including thousands or millions of files, is stored and accessed in order to fill the content servers 410. Although only a single fill source 430 is shown in FIG. 4, in various embodiments multiple fill sources 430 may be implemented to service requests for files. Further, as is well-understood, any cloud-based services can be included in the architecture of FIG. 4 beyond fill source 430 to the extent desired or necessary.

Figure 5:
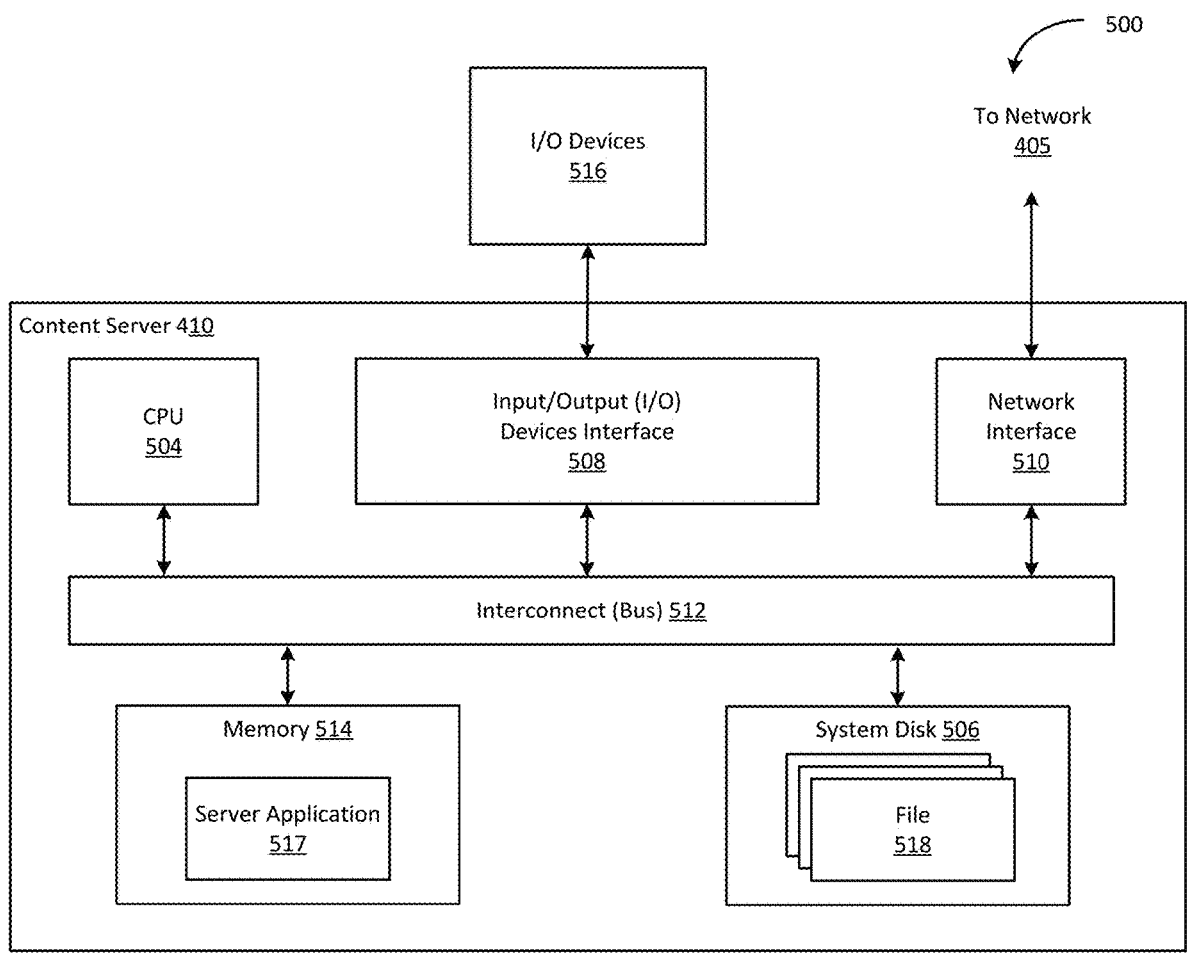
FIG. 5 is a block diagram of a content server that may be implemented in conjunction with the network infrastructure of FIG. 4, according to various embodiments of the present disclosure.

FIG. 5 is a block diagram of a content server 410 that may be implemented in conjunction with the network infrastructure 400 of FIG. 4, according to various embodiments of the present invention. As shown, the content server 410 includes, without limitation, a central processing unit (CPU) 504, a system disk 506, an input/output (I/O) devices interface 508, a network interface 510, an interconnect 511 and a system memory 514.

The CPU 504 is configured to retrieve and execute programming instructions, such as server application 517, stored in the system memory 514. Similarly, the CPU 504 is configured to store application data (e.g., software libraries) and retrieve application data from the system memory 514. The interconnect 511 is configured to facilitate transmission of data, such as programming instructions and application data, between the CPU 504, the system disk 506, I/O devices interface 508, the network interface 510, and the system memory 514. The I/O devices interface 508 is configured to receive input data from I/O devices 516 and transmit the input data to the CPU 504 via the interconnect 511. For example, I/O devices 516 may include one or more buttons, a keyboard, a mouse, and/or other input devices. The I/O devices interface 508 is further configured to receive output data from the CPU 504 via the interconnect 511 and transmit the output data to the I/O devices 516.

The system disk 506 may include one or more hard disk drives, solid state storage devices, or similar storage devices. The system disk 506 is configured to store nonvolatile data such as files 518 (e.g., audio files, video files, subtitles, application files, software libraries, etc.). The files 518 can then be retrieved by one or more endpoint devices 415 via the network 405. In some embodiments, the network interface 510 is configured to operate in compliance with the Ethernet standard.

The system memory 514 includes a server application 517 configured to service requests for files 518 received from endpoint device 415 and other content servers 410. When the server application 517 receives a request for a file 518, the server application 517 retrieves the corresponding file 518 from the system disk 506 and transmits the file 518 to an endpoint device 415 or a content server 410 via the network 405.

Figure 6:
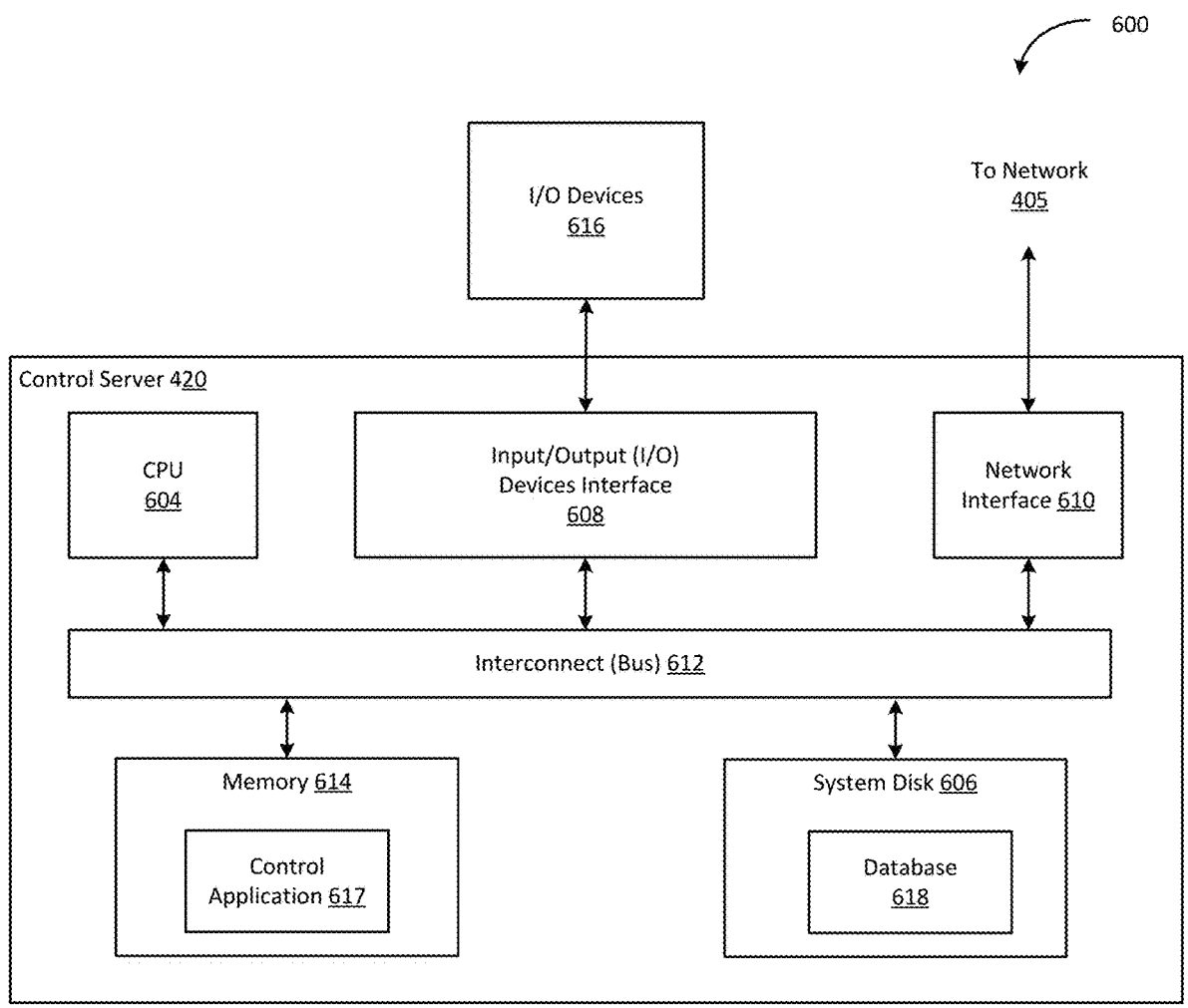
FIG. 6 is a block diagram of a control server that may be implemented in conjunction with the network infrastructure of FIG. 4, according to various embodiments of the present disclosure.

FIG. 6 is a block diagram of a control server 420 that may be implemented in conjunction with the network infrastructure 400 of FIG. 4, according to various embodiments of the present invention. As shown, the control server 420 includes, without limitation, a central processing unit (CPU) 604, a system disk 606, an input/output (I/O) devices interface 608, a network interface 610, an interconnect 612, and a system memory 614.

The CPU 604 is configured to retrieve and execute programming instructions, such as control application 617, stored in the system memory 614. Similarly, the CPU 604 is configured to store application data (e.g., software libraries) and retrieve application data from the system memory 614 and a database 618 stored in the system disk 606. The interconnect 612 is configured to facilitate transmission of data between the CPU 604, the system disk 606, I/O devices interface 608, the network interface 610, and the system memory 614. The I/O devices interface 608 is configured to transmit input data and output data between the I/O devices 616 and the CPU 604 via the interconnect 612. The system disk 606 may include one or more hard disk drives, solid state storage devices, and the like. The system disk 606 is configured to store a database 618 of information associated with the content servers 410, the fill source(s) 430, and the files 518.

The system memory 614 includes a control application 617 configured to access information stored in the database 618 and process the information to determine the manner in which specific files 518 will be replicated across content servers 410 included in the network infrastructure 400. The control application 617 may further be configured to receive and analyze performance characteristics associated with one or more of the content servers 410 and/or endpoint devices 415.

Figure 7:
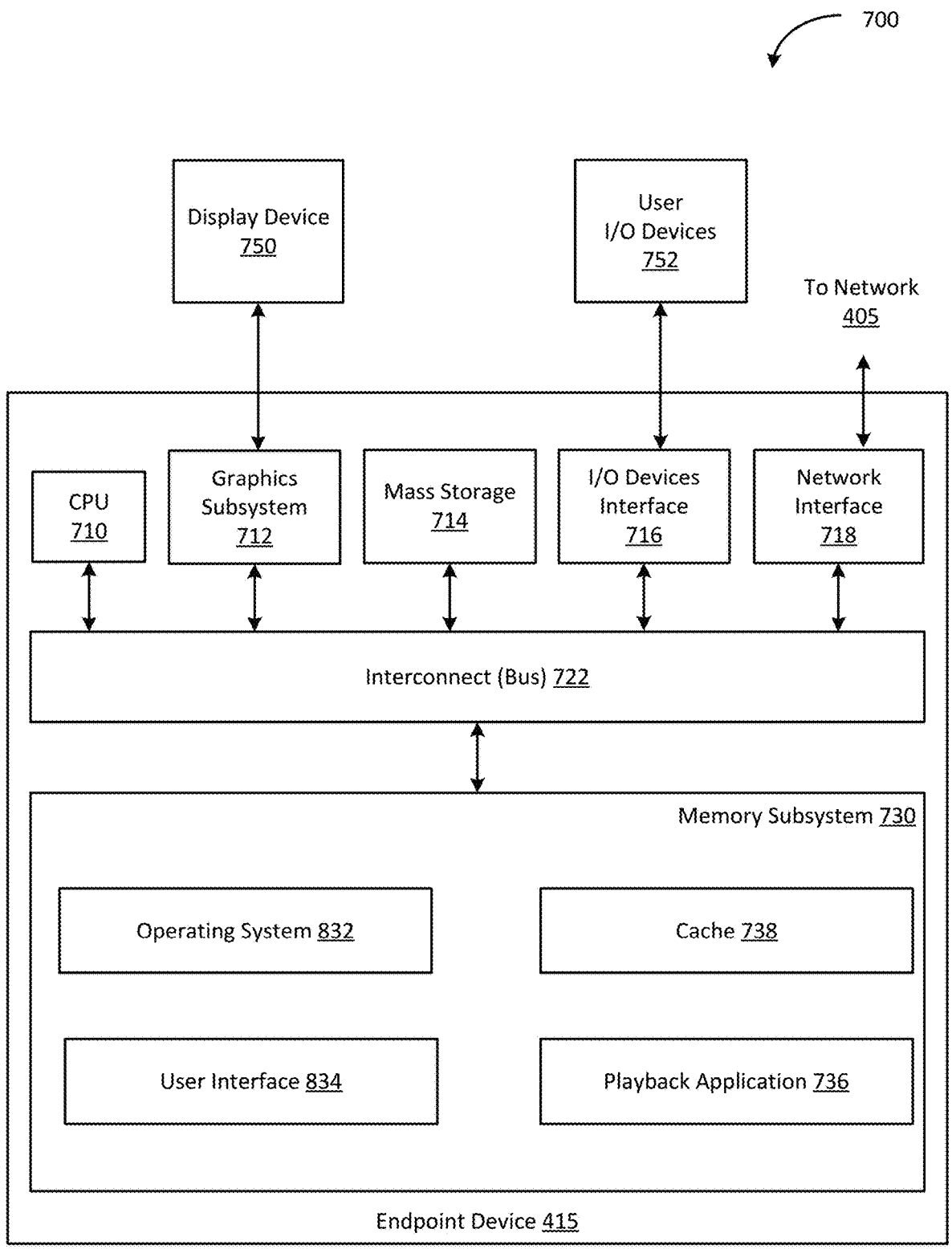
FIG. 7 is a block diagram of an endpoint device that may be implemented in conjunction with the network infrastructure of FIG. 4, according to various embodiments of the present disclosure.

FIG. 7 is a block diagram of an endpoint device 415 that may be implemented in conjunction with the network infrastructure 400 of FIG. 4, according to various embodiments of the present invention. As shown, the endpoint device 415 may include, without limitation, a CPU 710, a graphics subsystem 712, an I/O device interface 714, a mass storage unit 716, a network interface 718, an interconnect 722, and a memory subsystem 730.

In some embodiments, the CPU 710 is configured to retrieve and execute programming instructions stored in the memory subsystem 730. Similarly, the CPU 710 is configured to store and retrieve application data (e.g., software libraries) residing in the memory subsystem 730. The interconnect 722 is configured to facilitate transmission of data, such as programming instructions and application data, between the CPU 710, graphics subsystem 712, I/O devices interface 714, mass storage unit 716, network interface 718, and memory subsystem 730.

In some embodiments, the graphics subsystem 712 is configured to generate frames of video data and transmit the frames of video data to display device 750. In some embodiments, the graphics subsystem 712 may be integrated into an integrated circuit, along with the CPU 710. The display device 750 may comprise any technically feasible means for generating an image for display. For example, the display device 750 may be fabricated using liquid crystal display (LCD) technology, cathode-ray technology, and light-emitting diode (LED) display technology. An input/output (I/O) device interface 714 is configured to receive input data from user I/O devices 752 and transmit the input data to the CPU 710 via the interconnect 722. For example, user I/O devices 752 may comprise one of more buttons, a keyboard, and a mouse or other pointing device. The I/O device interface 714 also includes an audio output unit configured to generate an electrical audio output signal. User I/O devices 752 includes a speaker configured to generate an acoustic output in response to the electrical audio output signal. In alternative embodiments, the display device 750 may include the speaker. A television is an example of a device known in the art that can display video frames and generate an acoustic output.

A mass storage unit 716, such as a hard disk drive or flash memory storage drive, is configured to store non-volatile data. A network interface 718 is configured to transmit and receive packets of data via the network 405. In some embodiments, the network interface 718 is configured to communicate using the well-known Ethernet standard. The network interface 718 is coupled to the CPU 710 via the interconnect 722.

In some embodiments, the memory subsystem 730 includes programming instructions and application data that comprise an operating system 732, a user interface 734, and a playback application 736. The operating system 732 performs system management functions such as managing hardware devices including the network interface 718, mass storage unit 716, I/O device interface 714, and graphics subsystem 712. The operating system 732 also provides process and memory management models for the user interface 434 and the playback application 736. The user interface 734, such as a window and object metaphor, provides a mechanism for user interaction with endpoint device 415. Persons skilled in the art will recognize the various operating systems and user interfaces that are well-known in the art and suitable for incorporation into the endpoint device 415.

In some embodiments, the playback application 736 is configured to request and receive content from the content server 410 via the network interface 718. Further, the playback application 736 is configured to interpret the content and present the content via display device 750 and/or user I/O devices 752.

In sum, content processing application 122 receives one or more frames of media content item 130. Content processing application 122 determines whether one or more capture restriction(s) 140 are associated with device mode(s) 141. Content processing application 122 processes the one or more frames of media content item 130 based on whether one or more capture restriction(s) 140 are associated with device mode(s) 141. When device mode(s) 141 is associated with no capture restriction(s) 140, content processing application 122 enables one or more functions associated with performing one or more operations on media content item 130. When device mode(s) 141 is associated with one or more capture restriction(s) 140, content processing application 122 determines how to process the one or more frames of media content item 130 based on the result of the analysis performed by content analysis application 121.

As a part of the analysis, content analysis application 121 determines whether a given frame of media content item 130 is signed by analyzing one or more statistical properties of pixel data 132, one or more statistical properties of frame data 131, or the like. When content analysis application 121 determines that a given frame is signed, content analysis optionally determines whether the frame meets one or more conditions defined in one or more override rule(s) 142. When content analysis application 121 determines that a given frame of media content item 130 meets one or more conditions defined in one or more override rule(s) 142, content processing application 122 removes one or more capture restriction(s) 140 associated with device mode 141. In some embodiments, when content analysis application 121 determines that a given frame of media content item 130 is signed, content processing application 122 removes or overrides one or more capture restriction(s) 140 associated with device mode 141. When content analysis application 121 determines that a given frame of media content item 130 is not signed or that the frame does not meet one or more conditions defined in one or more override rule(s) 142, content processing application 122 restricts one or more functions on computing system 100 based on one or more capture restriction(s) 140 associated with the device mode 141.

Disclosed techniques allow for media content capture and streaming capabilities to be restricted at the hardware level, thereby making such copy restrictions difficult to circumvent unless permission is explicitly encoded within the media content item. The disclosed techniques allow content providers to incorporate the security features within each frame of the media content item, thereby providing more granular control over restrictions on media content. Further, content providers can dynamically vary the predetermined conditions under which restrictions on each frame of the media content item can be removed, thereby allowing more control over the security of the content. These technical advantages provide one or more technological advancements over prior art approaches.

1, In some embodiments, a computer-implemented method for securing media content capture capabilities on a device comprises: receiving a frame of a media content item; determining whether the frame of the media content item is signed based on an analysis of one or more pixels of the frame; and when the media content is signed, removing one or more restrictions on one or more functions on the device based on whether the one or more pixels on the frame meet one or more conditions, wherein the one or more functions enable the device to perform one or more operations on the frame of the media content item.

2. The computer-implemented method of clause 1, further comprising: determining a device mode; and determining whether the one or more restrictions on the one or more functions on the device are associated with the device mode.

3. The computer-implemented method of clauses 1 or 2, wherein the one or more restrictions on the one or more functions on the device are determined based on configuration data associated with a programmable logic device.

4, The computer-implemented method of clauses 1-3, wherein the one or more restrictions on the one or more functions on the device include restrictions on at least one of: content acquisition, content capture, content encoding control, content encoding manipulation, content streaming, content editing, content adaptation, or content distribution.

5. The computer-implemented method of clauses 1-4, wherein the one or more conditions are associated with one or more patterns of pixels.

6. The computer-implemented method of clauses 1-5, wherein the one or more patterns of pixels includes one or more blocks of pixels dispersed across one or more regions of the frame.

7, The computer-implemented method of clauses 1-6, wherein the one or more conditions are associated with one or more statistical properties of pixel data associated with the one or more pixels.

8, The computer-implemented method of clauses 1-7, wherein the one or more conditions are associated with a digital watermark.

9, The computer-implemented method of clauses 1-8, wherein the digital watermark includes a predefined structure formed by one or more blocks of pixels dispersed across one or more regions of the frame.

10. The computer-implemented method of clauses 1-9, wherein the one or more conditions are associated with one or more statistical properties of frame data associated with the frame.

11. The computer-implemented method of clauses 1-10, wherein the one or more restrictions on the one or more functions on the device include at least one of: reducing a frame rate of the media content item, reducing a resolution of the frame, or replacing the frame with another frame.

12. In some embodiments, one or more non-transitory computer readable media store instructions that, when executed by one or more processors, cause the one or more processors to perform the steps of: receiving a frame of a media content item, determining whether the frame of the media content item is signed based on an analysis of one or more pixels of the frame; and when the media content is signed, removing one or more restrictions on one or more functions on a device based on whether the one or more pixels on the frame meet one or more conditions, wherein the one or more functions enable the device to perform one or more operations on the frame of the media content item.

13. The one or more non-transitory computer readable media of clause 12, further comprising: determining a device mode; and determining whether the one or more restrictions on the one or more functions on the device are associated with the device mode.

14, The one or more non-transitory computer readable media of clauses 12 or 13, wherein the one or more restrictions on the one or more functions on the device are determined based on configuration data associated with a programmable logic device.

15. The one or more non-transitory computer readable media of clauses 12-14, wherein the one or more restrictions on the one or more functions on the device include restrictions on at least one of: content acquisition, content capture, content encoding control, content encoding manipulation, content streaming, content editing, content adaptation, or content distribution.

16. The one or more non-transitory computer readable media of clauses 12-15, wherein the one or more conditions are associated with one or more patterns of pixels, and wherein the one or more patterns of pixels includes one or more blocks of pixels dispersed across one or more regions of the frame.

17. The one or more non-transitory computer readable media of clauses 12-16, wherein the one or more conditions are associated with one or more statistical properties of pixel data associated with the one or more pixels.

18. The one or more non-transitory computer readable media of clauses 12-17, wherein the one or more conditions are associated with a digital watermark, and wherein the digital watermark includes a predefined structure formed by one or more blocks of pixels dispersed across one or more regions of the frame.

19. The one or more non-transitory computer readable media of clauses 12-18, wherein the one or more conditions are associated with one or more statistical properties of frame data associated with the frame.

20. In some embodiments, a system comprises: a memory storing one or more software applications; and a processor that, when executing the one or more software applications, is configured to perform the steps of: receiving a frame of a media content item; determining whether the frame of the media content item is signed based on an analysis of one or more pixels of the frame; and when the media content is signed, removing one or more restrictions on one or more functions on a device based on whether the one or more pixels on the frame meet one or more conditions, wherein the one or more functions enable the device to perform one or more operations on the frame of the media content item.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for securing media content capture capabilities on a device, the method comprising:
   receiving a frame of a media content item;
   determining a device mode associated with the device, wherein the device mode comprises a device setting;
   determining that the device mode includes a restriction on a function that enables the device to perform at least one operation on the frame of the media content item;
   in response to determining that the device mode includes the restriction, determining whether the frame of the media content item is signed based on an analysis of one or more pixels of the frame; and
   when the frame of the media content is signed, removing the restriction associated with the device mode when upon determining that the one or more pixels of the frame meet one or more conditions.

2. The computer-implemented method of claim 1, wherein the restriction on the function that enables the device to perform at least one operation on the frame of the media content item is determined based on configuration data associated with a programmable logic device.

3. The computer-implemented method of claim 1, wherein the restriction on the function that enables the device to perform at least one operation on the frame of the media content item includes a restriction on at least one of: content acquisition, content capture, content encoding control, content encoding manipulation, content streaming, content editing, content adaptation, or content distribution.

4. The computer-implemented method of claim 1, wherein the one or more conditions are associated with one or more patterns of pixels.

5. The computer-implemented method of claim 4, wherein the one or more patterns of pixels includes one or more blocks of pixels dispersed across one or more regions of the frame.

6. The computer-implemented method of claim 1, wherein the one or more conditions are associated with one or more statistical properties of pixel data associated with the one or more pixels.

7. The computer-implemented method of claim 1, wherein the one or more conditions are associated with a digital watermark.

8. The computer-implemented method of claim 7, wherein the digital watermark includes a predefined structure formed by one or more blocks of pixels dispersed across one or more regions of the frame.

9. The computer-implemented method of claim 1, wherein the one or more conditions are associated with one or more statistical properties of frame data associated with the frame.

10. The computer-implemented method of claim 1, wherein the restriction on the function that enables the device to perform at least one operation on the frame of the media content item includes at least one of: reducing a frame rate of the media content item, reducing a resolution of the frame, or replacing the frame with another frame.

11. One or more non-transitory computer readable media storing instructions that, when executed by one or more processors, cause the one or more processors to perform the steps of:
    receiving a frame of a media content item;
    determining a device mode associated with a device, wherein the device mode comprises a device setting;
    determining that the device mode includes a restriction on a function that enables the device to perform at least one operation on the frame of the media content item;
    in response to determining that the device mode includes the restriction, determining whether the frame of the media content item is signed based on an analysis of one or more pixels of the frame; and
    when the frame of the media content is signed, removing the restriction associated with the device mode upon determining that the one or more pixels of the frame meet one or more conditions.

12. The one or more non-transitory computer readable media of claim 11, wherein the restriction on the function that enables the device to perform at least one operation on the frame of the media content item is determined based on configuration data associated with a programmable logic device.

13. The one or more non-transitory computer readable media of claim 11, wherein the restriction on the function that enables the device to perform at least one operation on the frame of the media content item includes a restriction on at least one of: content acquisition, content capture, content encoding control, content encoding manipulation, content streaming, content editing, content adaptation, or content distribution.

14. The one or more non-transitory computer readable media of claim 11, wherein the one or more conditions are associated with one or more patterns of pixels, and wherein the one or more patterns of pixels includes one or more blocks of pixels dispersed across one or more regions of the frame.

15. The one or more non-transitory computer readable media of claim 11, wherein the one or more conditions are associated with one or more statistical properties of pixel data associated with the one or more pixels.

16. The one or more non-transitory computer readable media of claim 11, wherein the one or more conditions are associated with a digital watermark, and wherein the digital watermark includes a predefined structure formed by one or more blocks of pixels dispersed across one or more regions of the frame.

17. The one or more non-transitory computer readable media of claim 11, wherein the one or more conditions are associated with one or more statistical properties of frame data associated with the frame.

18. A system, comprising:
a memory storing one or more software applications; and
a processor that, when executing the one or more software applications, is configured to perform the steps of:
receiving a frame of a media content item;
determining a device mode associated with a device, wherein the device mode comprises a device setting;
determining that the device mode includes a restriction on a function that enables the device to perform at least one operation on the frame of the media content item;
in response to determining that the device mode includes the restriction, determining whether the frame of the media content item is signed based on an analysis of one or more pixels of the frame; and
when the frame of the media content is signed, removing the restriction associated with the device mode upon determining that the one or more pixels of the frame meet one or more conditions.

\* \* \* \* \*

UNITED STATES PATENT AND TRADEMARK OFFICE
CERTIFICATE OF CORRECTION

PATENT NO. : 12,067,135 B2
APPLICATION NO. : 17/121351
DATED : August 20, 2024
INVENTOR(S) : Frederic Turmel, Alexander David Wolfe and Matthew Michael Lehman It is certified that error appears in the above-identified patent and that said Letters Patent is hereby corrected as shown below:

In the Claims

Column 25, Claim 1, Line 42, please delete "when".

Signed and Sealed this
Fifteenth Day of October, 2024

Katherine Kelly Vidal
*Director of the United States Patent and Trademark Office*